United States Patent
Dyck et al.

(10) Patent No.: US 7,974,932 B2
(45) Date of Patent: Jul. 5, 2011

(54) SERVICE UTILITY PRICING MODEL

(75) Inventors: Bill Dyck, Roseville, CA (US); Luis Hurtado-Sanchez, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 612 days.

(21) Appl. No.: 11/584,711

(22) Filed: Oct. 20, 2006

(65) Prior Publication Data

US 2008/0097932 A1  Apr. 24, 2008

(51) Int. Cl.
*G06F 17/00* (2006.01)
*G06G 7/00* (2006.01)

(52) U.S. Cl. ............... 705/400; 705/7.35; 705/4

(58) Field of Classification Search ......... 705/400, 705/1, 7, 10, 26, 1.1, 7.35, 500, 7.29
See application file for complete search history.

(56) References Cited

U.S. PATENT DOCUMENTS

| | | | |
|---|---|---|---|
| 7,573,992 B1* | 8/2009 | Stark | 379/121.02 |
| 2002/0116348 A1* | 8/2002 | Phillips et al. | 705/400 |
| 2003/0163364 A1* | 8/2003 | Piercy et al. | 705/10 |
| 2004/0064421 A1* | 4/2004 | Bailey | 705/400 |
| 2004/0181492 A1* | 9/2004 | Rybakowski et al. | 705/63 |
| 2006/0149652 A1* | 7/2006 | Fellenstein et al. | 705/35 |
| 2007/0033069 A1* | 2/2007 | Rao et al. | 705/2 |
| 2009/0210355 A1* | 8/2009 | Dagum et al. | 705/400 |

OTHER PUBLICATIONS

Reid, Keith. "The Pricing Equation: Which Price is Right?" National Petroleum News, vol. 92 No. 2, pp. 16-18 and 25.*
Carlton, Dennis W. "Uncertainty, Production Lags, and Pricing" Feb. 1977, The American Economic Review, vol. 67, No. 1, pp. 244-249.*
Jaremko, Gordon. "Police say Alberta and B.C. are Smugglers' Targets" Jan. 21, 1996, Calgary Herald, p. A.6.*
"Vectren Corporation Reports Third Quarter 2004 Increase" PR Newswire Association LLC, Oct. 28, 2004.*

* cited by examiner

*Primary Examiner* — Fadey S Jabr
*Assistant Examiner* — Michael Harrington

(57) ABSTRACT

In one embodiment a method comprises a method of determining a price level for a computer-based service utility comprises determining a base price for the service utility, determining a loss premium for the service utility, and adding the loss premium to the base price level.

20 Claims, 3 Drawing Sheets

SERVICE UTILITY PRICING MODEL

BACKGROUND

Service utilities are becoming a major focus in the IT services industry. For consumers, one benefit of a service utility is being able to purchase as much of a service as needed at any given time without purchasing the complete infrastructure. For example, customers can purchase a service such as, e.g., CPU cycles, quantities of data storage, or mailboxes, without having to invest in a complete server environment. Service utilities allow customers to control their monthly expenses and purchase only the services they need.

However, existing pricing models assume non-negative rates of growth. The ability of customers to increase or decrease their consumption level at any time creates a need for new service utility pricing models.

DETAILED DESCRIPTION

Figure 1:
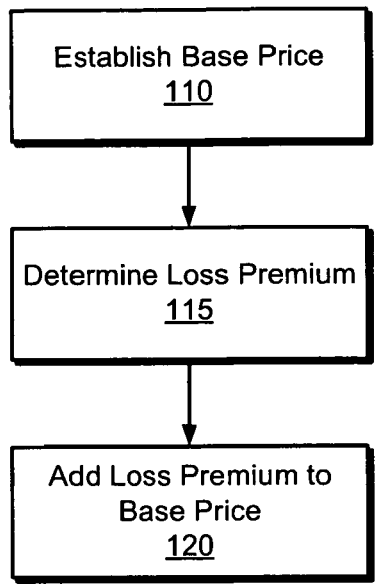
FIG. 1 a flowchart illustrating operations in one embodiment of a service utility pricing model.

FIG. 1 is a flowchart illustrating operations in one embodiment of a service utility pricing model. Referring to FIG. 1, at operation 110 a base price is established for a service utility. In some embodiments the base price may be established as a function of supply and demand for the service utility. At operation 115 a loss premium is determined for the service utility. Details of one embodiment of determining a loss premium for the service utility are discussed below. At operation 120 the loss premium is added to the base price. In some embodiments, the sum of the base price and the loss premium represent a final price for the service utility.

Figure 2:
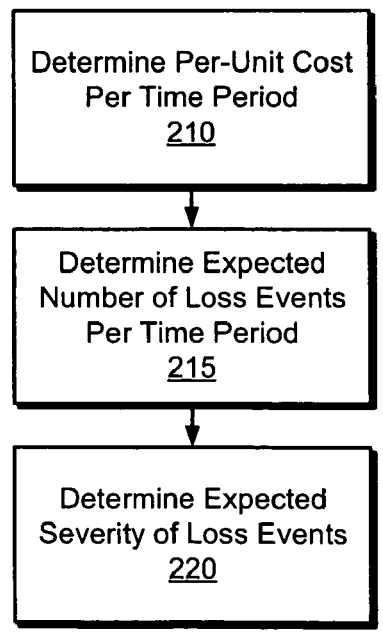
FIG. 2 is a flowchart illustrating operations in one embodiment of a method to determine a loss premium.

FIG. 2 is a flowchart illustrating operations in one embodiment of a method to determine a loss premium. In some embodiments the loss premium may be determined by three factors. The first factor represents a cost per unit of service over time (i.e., the maximum exposure to the service provider.) The second factor represents a number of loss events over time (i.e., occurrence and timing). The third factor represents a severity of loss events (i.e. 1 unit, 10 units, 100 units).

Regarding the first factor, at operation 210 a per-unit cost per period of time may be determined. A loss premium may be related to the overall unit of service cost of the specific infrastructure resource, i.e., the service utility, while a portion is unused. For example, the higher the resource cost, the higher the loss premium. Similarly, the longer the time over which the cost of the resources is defrayed, the lower the loss premium. Finally, the more growth per given period of time in customer consumption of service units, the lower the loss premium.

In some embodiments the total resource cost may be normalized e.g., by the total number of service units and by the effective period of time over which the cost of the assets are defrayed. In some embodiments, cost per unit of service for a given period of time may be determined as a function of the platform and labor costs for specific service utility divided by time over which the specific service utility costs will be defrayed, further divided by a number of units of specific service utility available to be sold.

Regarding the second factor, at operation 215 an expected number of loss events per period of time is determined. In some embodiments, a loss premium may be related to the number of loss events that occur in a given period of time. A loss event may be defined as an unexpected reduction in consumption of service units of a given service utility by a specific customer. Thus, multiple customers reducing their consumption in a given time period constitute multiple loss events in that period of time. The more loss events are expected to occur, the greater the loss premium should be. For example, the expected number of loss events in a given time period may equal a number of loss events multiplied by a probability that particular number of loss events will occur, summed across all possibilities Regarding the third factor, at operation 220 an expected severity of loss events is determined. The severity of loss events, different loss events, and especially loss events involving different types of infrastructure resources, may differently impact the service, the business, or the company offering the service utility. For example, the impact, or importance, of unsold, and thus underutilized, CPU-hours may be different from the impact of underutilized MB of storage. Additionally, one loss event may include the loss of many units, while another loss event includes the loss of a single unit. The expected impact of the subjective evaluation of severity in any given time period is affected by the severity level of particular events and the probability that a particular severity level actually occurs.

In some embodiments an expected severity of loss events in a given time period may represent a possible severity level multiplied by a probability that a particular severity level occurs, summed across all possibilities.

The second and third loss factors are related in that severity is only important to evaluate when a loss event has actually occurred. As such, the sum of the total probabilities is evaluated by summing the products of expected loss events against the range of expected severity levels.

In one embodiment, failure events and severity may be modeled using a Poisson distribution. Thus, the Poisson distribution is suitable for modeling such variables as the number of loss events in a given period of time, say a month, and the severity of each loss event, the number of service units idle or lost for any given loss event.

The loss event probability distribution and the severity level probability distribution may vary with the type of service utility being modeled. For example, different service utilities may inherently have customer bases of different sizes. The loss event distribution will vary based on the size of the customer base. A larger customer base means that the loss event distribution will have to account for a larger potential number of loss events. A larger customer base also means that the risk of any one specific customer not using expected service units is less than otherwise. The number of service units a specific customer consumes also affects the loss event distribution. Thus a service utility with few customers (each consuming many service units) will have a different loss event distribution from a service utility with many customers (each consuming a few service units).

A severity level distribution may also vary based on the statefulness of the service utility unit. For example, some service utilities have service units that are stateful in nature (e.g., virtual servers, storage). As used herein, the term stateful refers to service units that have specific ownership which lasts for a relatively long period of time. For example, a customer of a virtual server is assigned a specific server which he then has to prepare, or have prepared, in terms of operating system and applications and the like. Additionally, the customer's work and processes may come to depend on the specific service units. Therefore, the customer may find it inconvenient and even difficult to extricate himself from the use of specific service units. This skews the severity level distribution to favor fewer number of service units lost per given loss event.

Other service utilities may sell service units that are stateless in nature (i.e., CPU cycles). As used herein, the term stateless refers to service units have no particular owner or a relatively short lifetime. It is much easier for a customer to extricate himself from stateless service units. This skews the severity level distribution to favor larger numbers of service units lost per given loss event. Additionally, the granularity of the service unit within the service utility will also impact the severity level distribution such that minutely granular service units per platform would require a different severity level distribution from that of service utilities that provide only a handful of service units per platform.

In one embodiment, a loss premium may be determined using the following equation:

$$[(P/U)/T] * \left[\left(\sum_{l=1}^{L} L * LDp_L \left(\sum_{s=1}^{S} S * SDp_s\right)\right)\right] = \$ \text{ Loss Premium} \quad \text{Equation (1)}$$

Where the variables are given as follows:

TABLE 1

Loss Event Variables

| Variable Name | Symbol | Definition | Value |
|---|---|---|---|
| Platform | P | The minimum physical hardware, software, networks, labor and facility costs necessary to provide a host from which specific service units for consumption can be created and sold | Dollars |
| Units | U | The number of Service Utility units a single platform can support | Integer |
| Time | T | The time over which costs for a platform are defrayed and service units for that platform are sold | Unit of time (e.g., a month) |
| Loss Event Level | L | Number of loss events in a given time period | Integer |
| Loss Distribution | $LD_{pL}$ | Loss Event Probability Distribution | Probability distribution |
| Severity Level | S | How many service units are lost in any given loss event | Integer |
| Severity Distribution | $SD_{pS}$ | Severity Level Probability Distribution | Probability distribution |

Certain assumptions may be made when implementing a loss premium algorithm as described herein. Since both the loss event and severity level distributions are dependent on the type of service utility they are applied to, a level of understanding of the service utility is helpful. In some embodiments, historical service records may provide hard data. Other data may be estimated, based on experience or via simulations such as, e.g., through Monte Carlo simulation.

Consider, for example, a service by which customers may purchase virtual servers rather than physical servers. A virtual server is a fully-functioning server but exists, in reality, as a portion of an actual physical server.

A summary of a representative virtual server service is as follows:

Host physical server (HW)=$36,000 capital over three years
Host software (SW)=$18,000 capital over three years
Labor=$125,000 over three years
Datacenter (DC)=$50,000 over three years (power, pipe, ping)
20 virtual servers per host physical server (low granularity)
Each virtual server has a high degree of "state" maintained
Assume approximately 61 hosts providing over 1,200 virtual servers world wide.
Assume approximately 10 different businesses per geography using this service (30 total)
Each business uses a small number of servers in total with no one customer overwhelmingly consuming virtual servers compared to any other given customer.

Applying the first loss factor, each virtual server costs $318 per month to support. Assuming that a loss event occurs in a given month in which a customer decreases consumption by one virtual server (i.e., one service unit of the virtual server service utility) for that month unexpectedly, the remaining unused accumulated loss premiums would need to supply $318 to the service utility to ensure that there were enough funds to cover ongoing costs while a service unit previously consumed goes unused.

The data needed to derive the loss event and severity level probability distributions may be derived. The loss event probability distributions may be derived by looking at pre-set levels of the probability that there is not a loss event during any given month. That probability subtracted from 1 gives the probability of any loss event in a given month. That cumulative probability is spread across all loss events based on the results of Monte Carlo simulations using data from the experience with the virtual server service. Severity level probability distributions may be similarly derived.

Sample probability distributions for L=5% are in Table 2 and Table 3 below:

TABLE 2

Loss Event Probability Distribution

| L | $LD_{pL}$ |
|---|---|
| 0 | 0.9500 |
| 1 | 0.0250 |

TABLE 2-continued

Loss Event Probability Distribution

| L | $LD_{pL}$ |
|---|---|
| 2 | 0.0125 |
| 3 | 0.0063 |
| 4 | 0.0032 |
| 5 | 0.0016 |
| 6 | 0.0008 |
| 7 | 0.0004 |
| 8 | 0.0002 |
| 9 | 0.0000 |

Where the sum of $LD_{pL}$ always = 1

TABLE 3

Severity Level Probability Distribution

| S | $SD_{pS}$ |
|---|---|
| 1 | 0.5000 |
| 2 | 0.3000 |
| 3 | 0.1000 |
| 4 | 0.0700 |
| 5 | 0.0300 |
| 6 | 0.0000 |

Where the sum of $SD_{pS}$ always = 1

The variable "L" in Table 2 represents the number of loss events for the particular service utility during a given period of time, e.g., a month. The variable "S" in Table 3 represents the severity level associated with that particular service utility during the same period of time. The probability distributions for "L" and "S" and their associated ranges may vary depending on the specific service utility being modeled, whether CPU-hours or MB of storage. In Table 2 above, it is implicit that there's only a 0.05 probability of a loss event in that given month. That probability is then spread out over the number of loss events, 1, 2, etc.

A monthly loss premium was calculated for the virtual server service across a range of five values of probability for a loss event in any given month, 0.01 through 0.05. The calculated premiums are in Table 4 below:

TABLE 4

Calculated Loss Premiums for Given Loss Event Probabilities

| Probability of a loss event in a given month | Calculated monthly loss premium |
|---|---|
| .01 | $0.21 |
| .02 | $0.49 |
| .03 | $0.81 |
| .04 | $1.52 |
| .05 | $2.11 |

The loss premiums are relatively small, ranging from $0.21 to $2.11 per service unit per month, or 0.06% to 0.66% per month (i.e., of the $318 cost per virtual server per month). Further, the loss premiums increase more than linearly, as the probability of a loss event in a given month goes up.

One desired characteristic of the calculated loss premiums is that they be robust, i.e., subject to relatively little change, as the probability distributions used in the formula change as the probabilities are, after all, estimates.

In a Poisson distribution, lambda is the expected number of arrivals or occurrences which occur per unit of time. Thus, for the loss event probability distribution, lambda is the expected number of loss events per month. For the severity level probability distribution, lambda is the expected number of service units lost per loss event. The probability distributions were varied by varying the lambdas. Then loss premiums could be calculated for the extreme values of lambda, which corresponded to extreme values of the Poisson distributions.

Table 5 below shows the extreme values (maximum and minimum) reached for the loss premiums for specific levels of loss event probability as lambda is varied. The extreme values shown are the highest and lowest loss premium values calculated as lambda was varied between +2 and −2 standard deviations.

TABLE 5

Sensitivity of Loss Premiums to Variations in Lambda

| Probability of a loss event in a given month | Calculated monthly loss premium | Max and min loss premiums in lambda simulations | Max and min % deviations from original loss premium |
|---|---|---|---|
| .01 | $0.21 | $0.10-0.36 | 52-71% |
| .02 | $0.49 | $0.35-0.72 | 29-47% |
| .03 | $0.81 | $0.61-1.11 | 25-37% |
| .04 | $1.52 | $1.11-2.10 | 27-38% |
| .05 | $2.11 | $1.52-2.89 | 28-37% |

At relatively extreme values of lambda, the percentage deviations around the original calculated loss premiums are moderate, even when these percentage deviations are measured at extreme values (i.e., 2 standard deviations, representing 95% of the total range). This stability is a desirable characteristic for a loss premium algorithm. When actual probability distributions vary from simulated probability distributions used to calculate the loss premiums, there is relatively little danger of over-pricing or under-pricing the loss premium itself.

In some embodiments the loss premium may be adapted to accommodate growth. One assumption of a loss premium algorithm is that service units lost will be recovered over time. Loss premium funds may be used in the interim to cover times of idle usage. With negative total service unit usage growth, service units may never be entirely re-used, forcing the loss premium value to continually increase over time as the overall business contracts.

Figure 3:
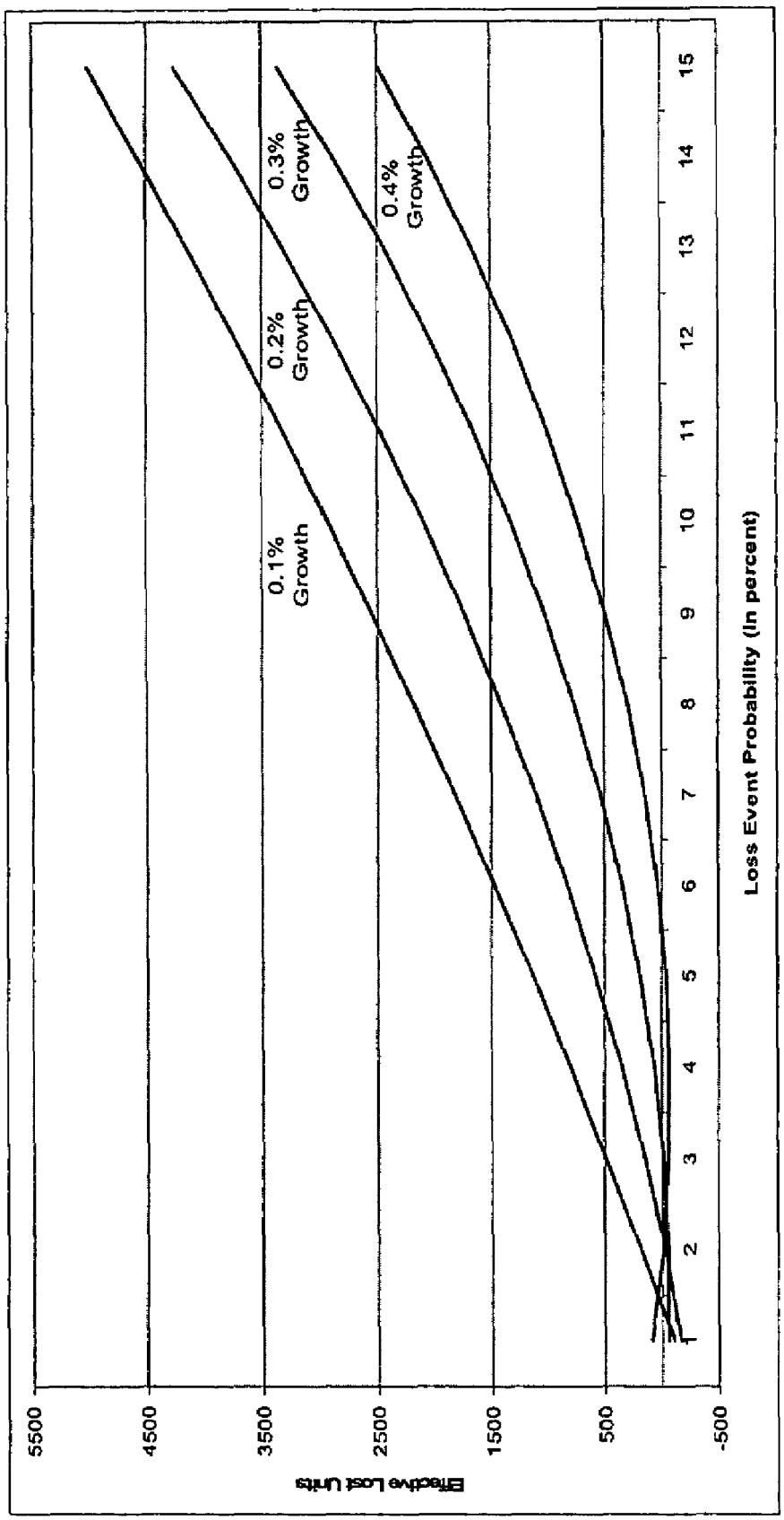
FIG. 3 is a graph illustrating changes in the number of effective lost units for different loss event probabilities using four different rates of demand growth.

Growth in service unit usage effectively reduces the number of service units lost from its absolute number, not accounting for re-use. FIG. 3 is a graph which shows the number of service units effectively lost versus the overall probability of a loss event in any given month, with the only change occurring in the rate of growth for the simulation. The dark lines represent a polynomial best-fit trend line for the data associated with each observation of the estimated number of lost service units. The graph motivates the need for the inclusion of a factor accounting for demand growth in a future version of the current equation, which posits a steady state with fluctuations around it). The graph implies that such a factor would vary inversely with the rate of growth. The higher the rate of growth, the smaller the factor, the smaller the loss premium, and vice-versa.

In some embodiments, the methods described herein may be embodied as logic instructions stored on a computer-readable medium. When executed on a processor, the logic instructions cause a general processor to be programmed as a special-purpose machine that implements the described methods. The processor, when configured by the logic instructions to execute the methods recited herein, constitutes structure for performing the described methods.

Figure 4:
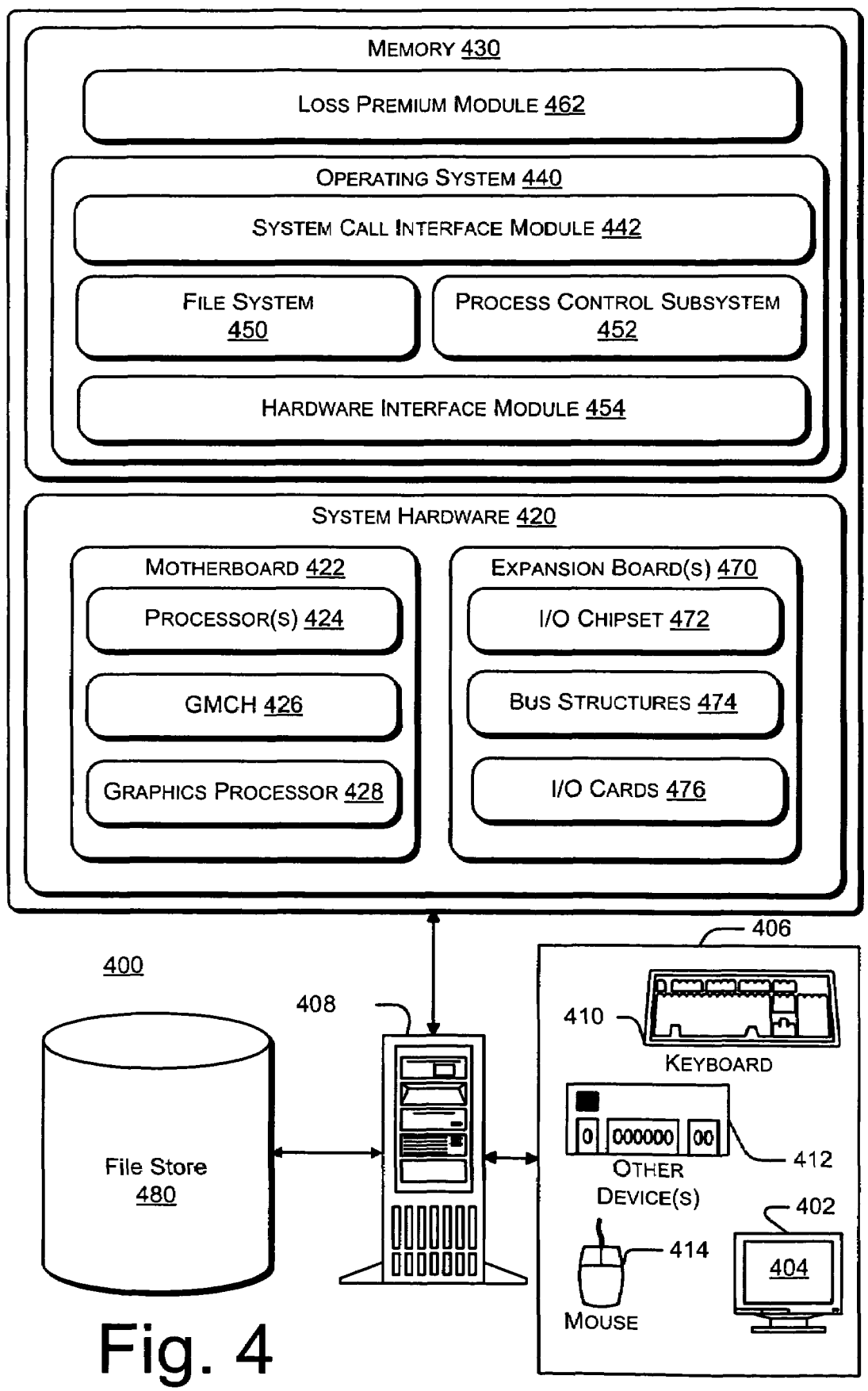
FIG. 4 is a flowchart illustrating operations in one embodiment of a method of anti-viral scanning in network attached storage.

FIG. 4 is a schematic illustration of an exemplary computer system 400 which may be used to implement a service utility pricing model as described herein. The computer system 400 includes a computer 408 and one or more accompanying input/output devices 406 including a display 402 having a screen 404, a keyboard 410, other I/O device(s) 412, and a mouse 414. The other device(s) 412 can include a touch screen, a voice-activated input device, a track ball, and any other device that allows the system 400 to receive input from a developer and/or a user.

System hardware 420 may comprise a motherboard 422, which may include at least one processor 424, a graphics and memory controller hub (GMCH) and a graphics processor 428. System hardware 420 may include one or more expansion boards 470, which may include an input/output (I/O) chipset 472, bus structures 474, and one or more I/O cards 476.

A file store 480 is communicatively connected to computer 408. File store 480 may be internal such as, e.g., one or more hard drives, or external such as, e.g., one or more external hard drives, network attached storage, or a separate storage network.

Computer 408 may further include random access memory and/or read-only memory 430. Memory 430 includes an operating system 440 for managing operations of computer 408. In one embodiment, operating system 440 includes a hardware interface module 454 that provides an interface to system hardware 420. In addition, operating system 440 includes one or more file systems 450 that managed files used in the operation of computer 408 and a process control subsystem 452 that manages processes executing on computer 408. Operating system 440 further includes a system call interface module 442 that provides an interface between the operating system 440 and one or more application modules that may execute on computer system 400.

In some embodiments, memory 430 may include one or more application modules such as loss premium module 462 that implements the methods described herein. In operation, loss premium module 462 executing on computer 408 makes calls to the system call interface module 442 to execute one or more commands on the computer's processor. The system call interface module 442 invokes the services of the file systems 450 to manage the files required by the command(s) and the process control subsystem 452 to manage the process required by the command(s). The file system 450 and the process control subsystem 452, in turn, invoke the services of the hardware interface module 454 to interface with the system hardware 420.

The particular embodiment of operating system 440 is not critical to the subject matter described herein. Operating system 440 may be embodied as a UNIX operating system or any derivative thereof (e.g., Linux, Solaris, etc.) or as a Windows® brand operating system.

Some embodiments discussed herein may be provided as computer program products, which may comprise a machine-readable or computer-readable medium having stored thereon instructions used to program a computer (or other electronic devices) to perform a process discussed herein. The machine-readable medium may comprise, but is not limited to, floppy diskettes, hard disk, optical disks, CD-ROMs, magneto-optical disks, ROMs, RAMs, erasable programmable ROMs (EPROMs), electrically erasable EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" or "some embodiments" means that a particular feature, structure, or characteristic described in connection with the embodiment is comprised in at least an implementation. The appearances of the phrase "in one embodiment" in various places in the specification are not necessarily all referring to the same embodiment.

What is claimed is:

1. A computer-based method of determining a price level for a computer-based service utility, comprising:
establishing a base price for the computer-based service utility by a processor, and code stored in memory and executable by the processor, wherein the service utility is provided via a physical server;
determining, by the processor and the code stored in memory, a loss premium for the service utility based on a loss event, wherein the loss event comprises a halt in consumption by a customer of at least one service unit of the service utility, and wherein the loss premium is correlative with ongoing costs to provide the service unit during a time period the at least one service unit is not consumed by the customer, and the loss premium is a function of a number of loss events and severity of the loss events; and adding the loss premium to the base price level by the processor and the code stored in memory.

2. The computer-based method of claim 1, wherein determining a loss premium for the service utility comprises determining a per-unit cost over a specific time period.

3. The computer-based method of claim 2, wherein determining a loss premium for the service utility comprises determining an expected number of loss events in the specified time period.

4. The computer-based method of claim 3, wherein determining an expected number of loss events in the specified period of time comprises summing, over a plurality of loss events, a product of loss events multiplied by a probability associated with the loss events.

5. The computer-based method of claim 3, wherein determining a loss premium for the service utility comprises determining an expected severity of loss events during the specified time period.

6. The computer-based method of claim 5, wherein determining an expected severity of loss events in the specified period of time comprises summing, over a plurality of severity levels, a product of severity levels multiplied by a probability of a loss of a specific severity level.

7. The computer-based method of claim 1, further comprising adjusting the loss premium to compensate for changes in the utilization rate of the service utility.

8. The computer-based method of claim 1, wherein the loss premium is calculated as the product of a per-unit cost over a specific time period multiplied by an expected number of loss events in the specified period of time multiplied by an expected severity of loss events during the specified period of time.

9. A computer system, comprising:
a processor; and
a memory module coupled to the processor and comprising logic instructions stored on a computer readable medium which, when executed, configure the processor to:
establish a base price for a computer-based service utility;
determine a loss premium for the service utility based on a loss event comprising a reduction in consumption by a customer of at least one service unit of the service utility, wherein the loss premium is a function of a number of loss events and severity of the loss events, wherein the loss premium is correlative with ongoing costs to maintain infrastructure to provide the service unit during a time period the at least one service unit is not consumed by the customer; and
add the loss premium to the base price level.

10. The computer system of claim 9, further comprising logic instructions stored on a computer readable medium which, when executed, configure the processor to determine the loss premium by calculating a per-unit cost over a specific time period.

11. The computer system of claim 9, further comprising logic instructions stored on a computer readable medium which, when executed, configure the processor to determine the loss premium by determining an expected number of loss events in a specified time period.

12. The computer system of claim 9, further comprising logic instructions stored on a computer readable medium which, when executed, configure the processor to sum, over a plurality of loss events, a product of loss events multiplied by a probability associated with the loss events, wherein the loss premium is based on the sum.

13. The computer system of claim 9, further comprising logic instructions stored on a computer readable medium which, when executed, configure the processor to determine an expected severity of loss events during a specified time period, wherein the loss premium is based on the expected severity of loss.

14. The computer system of claim 9, further comprising logic instructions stored on a computer readable medium which, when executed, configure the processor to sum, over a plurality of severity levels, a product of severity levels multiplied by a probability of a loss of a specific severity level, wherein the loss premium is based on the sum.

15. The computer system of claim 9, further comprising logic instructions stored on a computer readable medium which, when executed, configure the processor to adjust the loss premium to compensate for changes in the utilization rate of the service utility.

16. The computer system of claim 9, further comprising logic instructions stored on a computer readable medium which, when executed, configure the processor to calculate the loss premium as the product of a per-unit cost over a specific time period multiplied by an expected number of loss events in the specified period of time multiplied by an expected severity of loss events during the specified period of time.

17. A computer program product comprising logic instructions tangibly embodied on a non-transitory computer-readable medium which, when executed by a computer processor, configures the processor to:
establish a base price for a computer-based service utility;
determine a loss premium for the service utility as a function of a number of loss events and severity of the loss events, wherein a loss event comprises an occurrence of a customer ceasing purchase of at least one service unit of the service utility, and wherein the loss premium is calculated correlative with ongoing costs of maintaining capability to provide the service unit during a time period the at least one service unit is not purchased by the customer; and
add the loss premium to the base price level.

18. The computer program product of claim 17, further comprising logic instructions tangibly embodied on a non-transitory computer readable medium which, when executed, configures the processor to determine a per-unit cost over a specific time period, wherein the loss premium is a function of the per-unit cost.

19. The computer program product of claim 17, further comprising logic instructions tangibly embodied on a non-transitory computer readable medium which, when executed, configures the processor to sum, over a plurality of loss events, a product of loss events multiplied by a probability associated with the loss events, wherein the loss premium is a function of the sum.

20. The computer program product of claim 17, further comprising logic instructions tangibly embodied on a non-transitory computer readable medium which, when executed, configures the processor to sum, over a plurality of severity levels, a product of severity levels multiplied by a probability of a loss of a specific severity level, wherein the loss premium is a function of the sum.

* * * * *